United States Patent
Ishida

(10) Patent No.: US 11,726,676 B2
(45) Date of Patent: Aug. 15, 2023

(54) ELECTRONIC APPARATUS

(71) Applicant: SEIKO EPSON CORPORATION, Tokyo (JP)

(72) Inventor: Hitoshi Ishida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 269 days.

(21) Appl. No.: 17/166,271

(22) Filed: Feb. 3, 2021

(65) Prior Publication Data

US 2021/0240366 A1 Aug. 5, 2021

(30) Foreign Application Priority Data

Feb. 5, 2020 (JP) .................................. 2020-017803

(51) Int. Cl.
  *G06F 3/06* (2006.01)
  *H04L 9/08* (2006.01)
  *G06F 21/78* (2013.01)
  *G06F 21/60* (2013.01)

(52) U.S. Cl.
  CPC .......... *G06F 3/0623* (2013.01); *G06F 3/0655* (2013.01); *G06F 3/0679* (2013.01); *G06F 21/602* (2013.01); *G06F 21/78* (2013.01); *H04L 9/088* (2013.01); *H04L 9/0822* (2013.01); *H04L 9/0897* (2013.01); *H04L 2209/127* (2013.01)

(58) Field of Classification Search
  CPC .... G06F 3/0623; G06F 3/0655; G06F 3/0679; G06F 21/602; G06F 21/78; H04L 9/0822; H04L 9/088; H04L 9/0897; H04L 2209/127
  See application file for complete search history.

(56) References Cited

U.S. PATENT DOCUMENTS

2009/0307499 A1 12/2009 Senda
2010/0235648 A1* 9/2010 Hoang .................. G06F 21/575
  713/189

FOREIGN PATENT DOCUMENTS

JP 2009-294859 A 12/2009

* cited by examiner

*Primary Examiner* — Ayoub Alata
(74) *Attorney, Agent, or Firm* — Workman Nydegger

(57) ABSTRACT

A multifunction device includes: a non-volatile memory storing encrypted information, which is information that is encrypted; a TPM for decrypting the encrypted information; and a main board communicating with the non-volatile memory and the TPM. The non-volatile memory and the TPM are attachable to and removable from the main board, as a single body. More specifically, the multifunction device includes: a first sub board which has the non-volatile memory attached thereto and is attachable to and removable from the main board; and a chip board which has the TPM attached thereto and is attachable and removable from the first sub board.

5 Claims, 6 Drawing Sheets

ELECTRONIC APPARATUS

The present application is based on, and claims priority from JP Application Serial Number 2020-017803, filed Feb. 5, 2020, the disclosure of which is hereby incorporated by reference herein in its entirety.

BACKGROUND

1. Technical Field

The present disclosure relates to an electronic apparatus.

2. Related Art

JP-A-2009-294859 discloses a multifunction device having a non-volatile memory which stores encrypted data and a TPM (Trusted Platform Module) for decrypting encrypted data. In this multifunction device, the TPM is directly attached to a controller board and the non-volatile memory is provided separately from the controller board.

In the configuration of JP-A-2009-294859, when the controller board malfunctions, the TPM needs to be removed from the controller board so as to replace the controller board. Therefore, in a circumstance where controller boards of a plurality of multifunction devices are being replaced, a TPM may be wrongly installed on a controller board that is not the controller board where this TPM should be installed. When the TPM is wrongly installed, the non-volatile memory and the TPM do not form a correct combination and therefore the multifunction device cannot operate normally.

SUMMARY

An electronic apparatus according to an aspect of the present disclosure includes: a non-volatile storage medium storing encrypted information, which is information that is encrypted; a security chip for decrypting the encrypted information; and a main board communicating with the non-volatile storage medium and the security chip. The non-volatile storage medium and the security chip are attachable to and removable from the main board, as a single body.

DESCRIPTION OF EXEMPLARY EMBODIMENTS

First Embodiment

Figure 1:
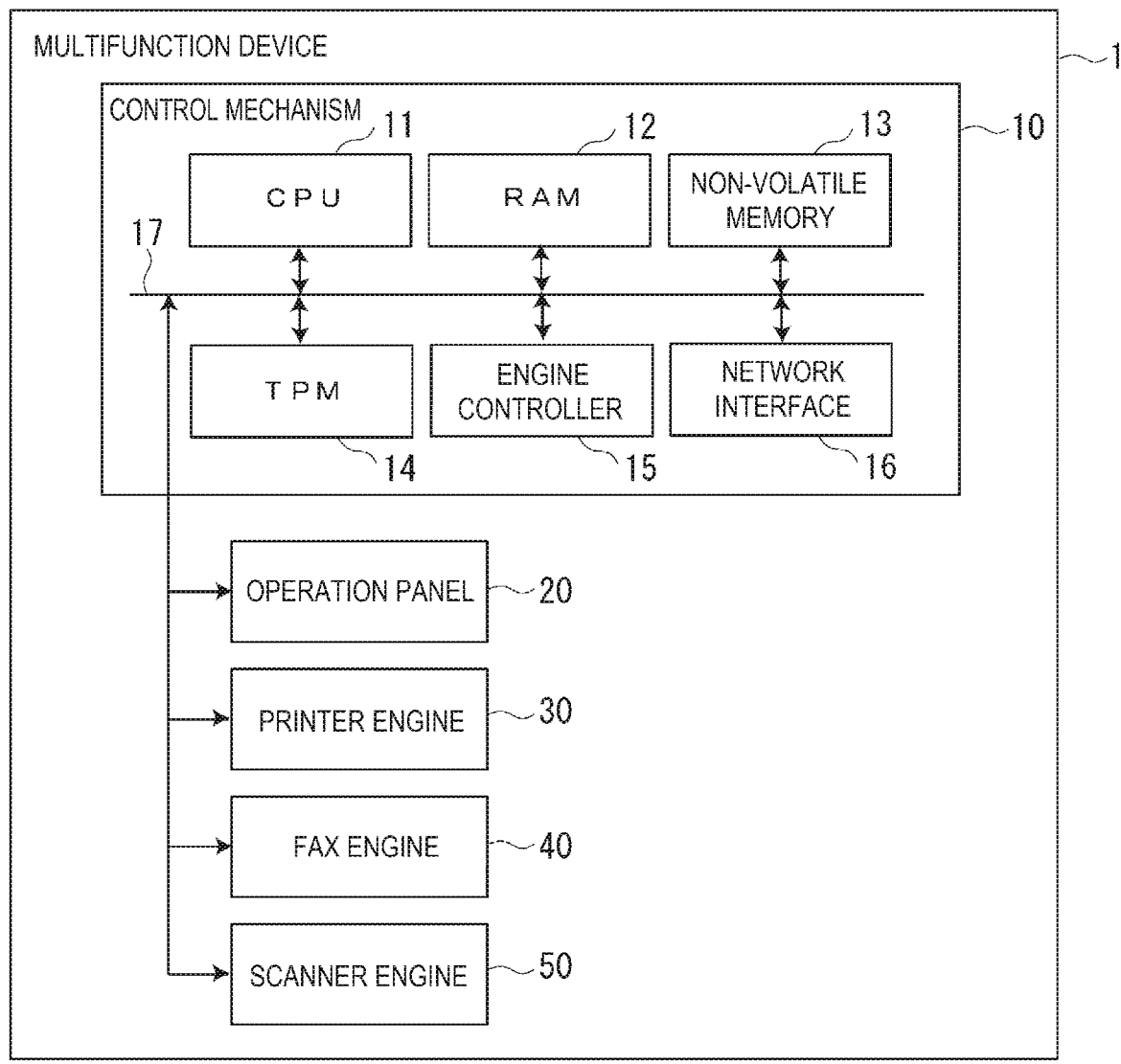
FIG. 1 is a block diagram showing the hardware configuration of a multifunction device.

An electronic apparatus according to an embodiment will now be described with reference to the accompanying drawings. FIG. 1 is a block diagram showing the hardware configuration of a multifunction device 1, which is an example of the electronic apparatus.

The multifunction device 1 has a control mechanism 10, an operation panel 20, a printer engine 30, a fax engine 40, and a scanner engine 50. The control mechanism 10 controls the operation panel 20, the printer engine 30, the fax engine 40, and the scanner engine 50.

The control mechanism 10 has a CPU (central processing unit) 11, a RAM (random-access memory) 12, a non-volatile memory 13, a TPM 14, an engine controller 15, and a network interface 16. These components are coupled together via a bus 17. The CPU 11 is an example of a "control unit". The non-volatile memory 13 is an example of a "non-volatile storage medium". The TPM 14 is an example of a "security chip". Of these components of the control mechanism 10, the CPU 11, the RAM 12, the engine controller 15, and the network interface 16 are provided at a main board B0 (see FIG. 4). The non-volatile memory 13 is attached by soldering or the like to a first sub board B1 (see FIG. 4), which is a board that is attachable to and removable from the main board B0. The TPM 14 is attached by soldering or the like to a chip board BC (see FIG. 4), which is a board that is attachable to and removable from the first sub board B1.

The CPU 11 loads various programs stored in the non-volatile memory 13 into the RAM 12 and thus controls each part of the multifunction device 1. Instead of the CPU 11, a hardware circuit such as an ASIC (application-specific integrated circuit) may be used as a processor. The processor may be configured to operate based on a cooperation between one or more CPUs and a hardware circuit such as an ASIC.

The non-volatile memory 13 is, for example, a flash memory and stores various programs and various data. The non-volatile memory 13 also stores encrypted information 13b (see FIG. 2), which is user information that is encrypted. The user information is registered by a user using the multifunction device 1 and is, for example, a password and user identification information of the user or the like. However, the encrypted information 13b is not limited to the user information and may be various kinds of information that need to be kept secret for security reasons.

The TPM 14 is a tamper-resistant security chip. The TPM 14 is used to decrypt the encrypted information 13b stored in the non-volatile memory 13. The multifunction device 1 according to this embodiment is characterized in integrally managing the non-volatile memory 13 and the TPM 14. If the non-volatile memory 13 and the TPM 14 are managed separately, when the main board B0 is replaced due to a malfunction or the like of the main board B0, there is a risk that the non-volatile memory 13 and the TPM 14 may form a wrong combination. When the wrong combination of the non-volatile memory 13 and the TPM 14 is used, authentication by the TPM 14 cannot be performed and therefore the multifunction device 1 does not operate normally. In this embodiment, the non-volatile memory 13 and the TPM 14 are integrally managed, thus restraining the occurrence of a wrong combination. The functions of the non-volatile memory 13 and the TPM 14 and the configuration to integrally manage these components will be described later.

The engine controller 15 controls the printer engine 30, the fax engine 40, and the scanner engine 50.

The network interface 16 communicates with an external device via a network, not illustrated. For example, the network interface 16 transmits fax data scanned by the fax engine 40 and scan data scanned by the scanner engine 50, to the external device.

The operation panel 20 is an operation unit for the user to carry out various operations. The user registers user information, using the operation panel 20. The user information is, for example, information that links information such as a login password to log in to the multifunction device 1, a recipient of fax data, or a recipient of scan data, with a user ID specifying the user. The user information may be able to be registered not only via the operation panel 20 but also by using an external device coupled via a network.

The printer engine 30 is a printing mechanism printing on a print medium such as a print sheet. The fax engine 40 is a fax mechanism sending and receiving a fax. The scanner engine 50 is a scanning mechanism scanning a scan medium such as a document.

Figure 2:
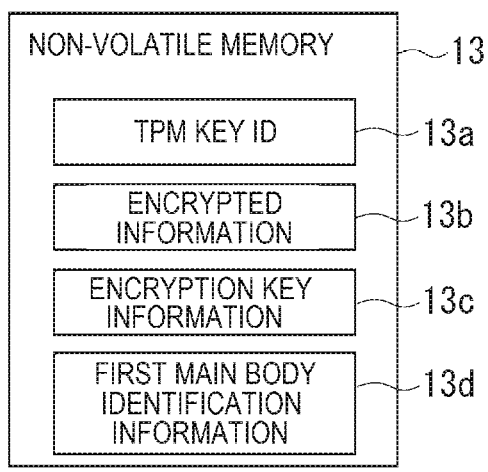
FIG. 2 is an explanatory view of a non-volatile memory.

The information stored in the non-volatile memory 13 and the TPM 14 and the functions of these components will now be described with reference to FIGS. 2 and 3. FIG. 2 is an explanatory view of the non-volatile memory 13. The non-volatile memory 13 stores a TPM key ID 13*a*, the encrypted information 13*b*, encryption key information 13*c*, and first main body identification information 13*d*, as information involved in the exchanges with the TPM 14. The first main body identification information 13*d* is an example of "first identification information".

The TPM key ID 13*a* is information for identifying a second encryption key 14*b* of the TPM 14. The encrypted information 13*b* is information of the foregoing user information that is encrypted. The encryption key information 13*c* is information formed by encrypting a first encryption key for encrypting and decrypting the encrypted information 13*b*, with the second encryption key 14*b*. The first main body identification information 13*d* is information unique to the multifunction device 1. The TPM key ID 13*a* is generated and stored on the initial startup of the multifunction device 1 and is not rewritten from then onward. Meanwhile, the encryption key information 13*c* is generated and stored every time the encrypted information 13*b* is encrypted.

Figure 3:
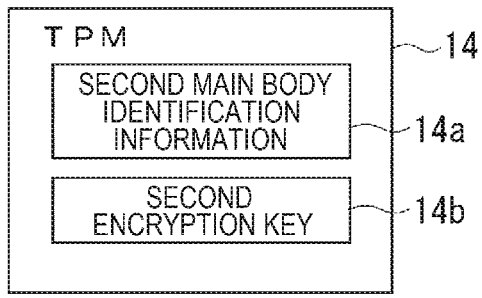
FIG. 3 is an explanatory view of a TPM.

FIG. 3 is an explanatory view of the TPM 14. The TPM 14 stores second main body identification information 14*a* and the second encryption key 14*b*, as information involved in the exchanges with the non-volatile memory 13. The second main body identification information 14*a* is an example of "second identification information".

The second main body identification information 14*a* is information for determining whether the non-volatile memory 13 and the TPM 14 form a correct combination or not. The second main body identification information 14*a* corresponds to the first main body identification information 13*d* stored in the non-volatile memory 13 of the correct combination. The second encryption key 14*b* is a key for encrypting the first encryption key and decrypting the encryption key information 13*c*. The second main body identification information 14*a* and the second encryption key 14*b* are generated and stored on the initial startup of the multifunction device 1 and are not rewritten from then onward. When the second encryption key 14*b* is generated, the TPM 14 transfers the TPM key ID 13*a* corresponding to the generated second encryption key 14*b* to the CPU 11. The CPU 11 stores the TPM key ID 13*a* into the non-volatile memory 13.

Procedures for encrypting user information will now be described. The encryption of user information is carried out when the user information is registered. First, the CPU 11 generates a first encryption key and transmits the generated first encryption key to the TPM 14. The TPM 14 encrypts the first encryption key, using the second encryption key 14*b*, and writes the encryption key information 13*c*, which is the information formed by encrypting the first encryption key, into the RAM 12. The CPU 11 reads out the encryption key information 13*c* from the RAM 12 and stores the encryption key information 13*c* into the non-volatile memory 13. Meanwhile, the CPU 11 encrypts the user information, using the first encryption key. The CPU 11 stores the encrypted information 13*b*, which is the information formed by encrypting the user information, into the non-volatile memory 13.

Procedures for decrypting the encrypted information 13*b* will now be described. The decryption of the encrypted information 13*b* is carried out on the startup of the multifunction device 1. The CPU 11 collates the first main body identification information 13*d* stored in the non-volatile memory 13 with the second main body identification information 14*a* stored in the TPM 14 and authenticates whether the TPM 14 is the correct TPM for the non-volatile memory 13. When the authentication is successful, the CPU 11 enables the use of the TPM 14. The CPU 11 then transmits the TPM key ID 13*a* and the encryption key information 13*c* stored in the non-volatile memory 13 to the TPM 14. The TPM 14 decrypts the encryption key information 13*c*, using the second encryption key 14*b* corresponding to the TPM key ID 13*a*, and writes the first encryption key, which is the information formed by decrypting the encryption key information 13*c*, into the RAM 12. The CPU 11 reads out the first encryption key from the RAM 12, decrypts the encrypted information 13*b* stored in the non-volatile memory 13, using the first encryption key, and writes the decrypted user information into the RAM 12.

Figure 4:
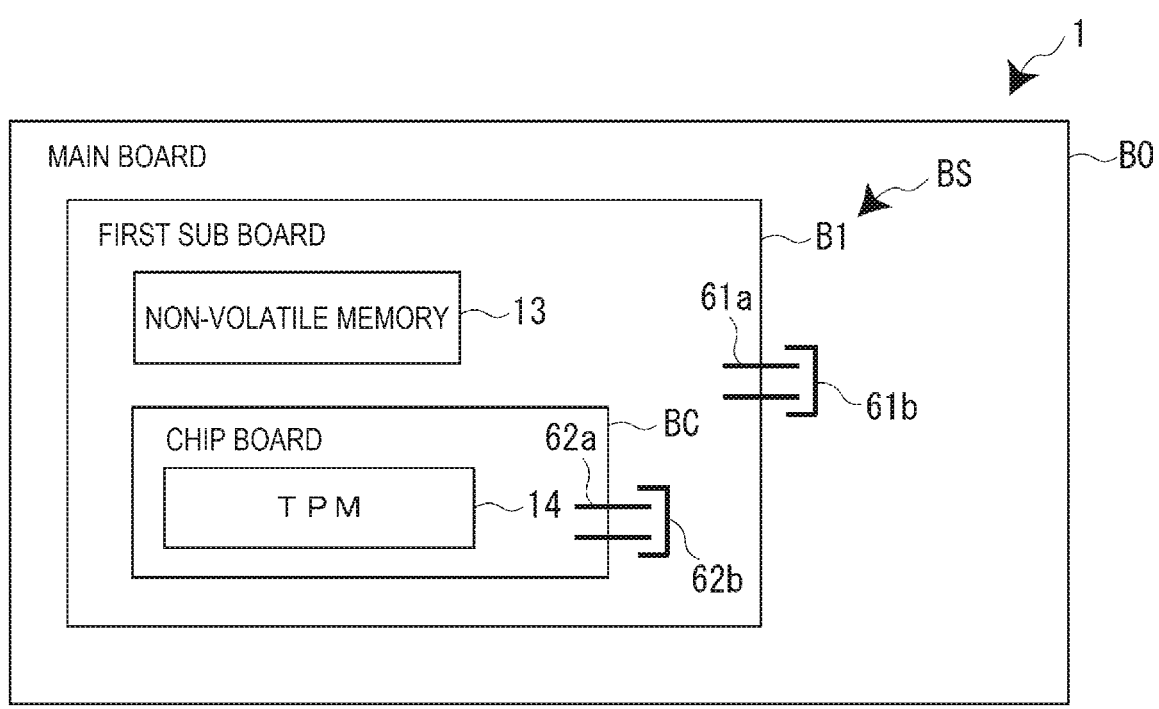
FIG. 4 shows a board configuration according to a first embodiment.

The configuration to integrally manage the non-volatile memory 13 and the TPM 14 will now be described with reference to FIG. 14. FIG. 4 shows the board configuration according to the first embodiment. The multifunction device 1 has the non-volatile memory 13, the TPM 14, and the main board B0 communicating with the non-volatile memory 13 and the TPM 14. The non-volatile memory 13 and the TPM 14 are configured to be attachable to and removable from the main board B0, as a single body, that is, as a single unit.

More specifically, the multifunction device 1 has a sub board part BS. The sub board part BS according to this embodiment has the first sub board B1. The non-volatile memory 13 is attached to the first sub board B1. The first sub board B1 is configured to be attachable to and removable from the main board B0. The multifunction device 1 also has the chip board BC. The TPM 14 is attached to the chip board BC. The chip board BC is configured to be attachable to and removable from the first sub board B1.

The first sub board B1 has a first sub board-side first attachment part 61*a*. The main board B0 has a main board-side first attachment part 61*b*. As the first sub board-side first attachment part 61*a* and the main board-side first attachment part 61*b* engage with each other, the first sub board B1 is removably installed on the main board B0. The first sub board-side first attachment part 61*a* and the main board-side first attachment part 61*b* are implemented, for example, by a connector. Also, various attachment parts described below can be implemented by a connector.

Similarly, the chip board BC has a chip board-side first attachment part 62*a*. The first sub board B1 has a first sub board-side second attachment part 62*b*. As the chip board-side first attachment part 62*a* and the first sub board-side second attachment part 62*b* engage with each other, the chip board BC is installed on the first sub board B1.

As described above, in the multifunction device 1 according to the first embodiment, the first sub board B1 having the non-volatile memory 13 and the TPM 14 is attachable to and removable from the main board B0 and therefore the non-volatile memory 13 and the TPM 14 can be integrally managed. Thus, for example, when the main board B0 is replaced due to a malfunction or the like of the main board B0, the occurrence of a wrong combination of the non-volatile memory 13 and the TPM 14 can be restrained.

In the multifunction device 1, the chip board BC having the TPM 14 attached thereto is attachable to and removable from the first sub board B1 having the non-volatile memory 13 attached thereto. Therefore, the TPM 14 can be readily replaced. This enables a flexible response to a change in the configuration corresponding to the destination to which the multifunction device 1 is sent, or the like.

The encrypted information 13b formed by encrypting the user information is stored in the non-volatile memory 13. Therefore, even when the main board B0 is replaced, the encrypted information 13b is left as it is and the user information can be acquired by decrypting the encrypted information 13b.

Second Embodiment

A second embodiment of the present disclosure will now be described. In this embodiment, a component similar to that in the first embodiment is denoted by a similar reference sign and is not described further in detail. A modification example applied to a component in the first embodiment is similarly applied to a similar component in this embodiment.

Figure 5:
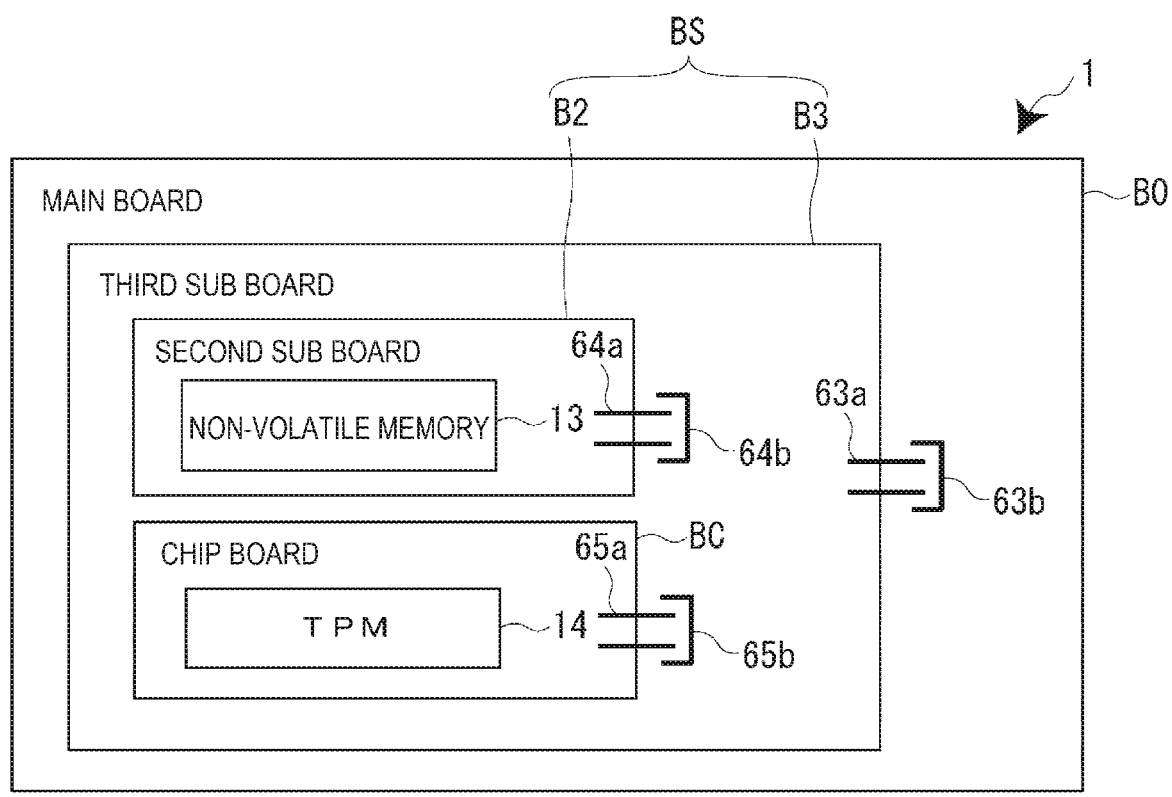
FIG. 5 shows a board configuration according to a second embodiment.

FIG. 5 shows the board configuration according to the second embodiment. The multifunction device 1 has a sub board part BS. The sub board part BS according to this embodiment has a second sub board B2 and a third sub board B3. The third sub board B3 is configured to be attachable to and removable from the main board B0. The second sub board B2 has the non-volatile memory 13 attached thereto and is configured to be attachable to and removable from the third sub board B3. The multifunction device 1 also has a chip board BC. The chip board BC has the TPM 14 attached thereto and is configured to be attachable to and removable from the third sub board B3.

The third sub board B3 has a third sub board-side first attachment part 63a. The main board B0 has a main board-side second attachment part 63b. As the third sub board-side first attachment part 63a and the main board-side second attachment part 63b engage with each other, the third sub board B3 is removably installed on the main board B0.

Similarly, the second sub board B2 has a second sub board-side attachment part 64a. The third sub board B3 has a third sub board-side second attachment part 64b. As the second sub board-side attachment part 64a and the third sub board-side second attachment part 64b engage with each other, the second sub board B2 is removably installed on the third sub board B3.

Similarly, the chip board BC has a chip board-side second attachment part 65a. The third sub board B3 has a third sub board-side third attachment part 65b. As the chip board-side second attachment part 65a and the third sub board-side third attachment part 65b engage with each other, the chip board BC is removably installed on the third sub board B3.

As described above, in the multifunction device 1 according to the second embodiment, the second sub board B2 having the non-volatile memory 13 attached thereto and the chip board BC having the TPM 14 attached thereto are attachable to and removable from the third sub board B3, and the third sub board B3 is attachable to and removable from the main board B0. Therefore, the non-volatile memory 13 and the TPM 14 can be integrally managed. Thus, when the main board B0 is replaced due to a mal-function or the like of the main board B0, the occurrence of a wrong combination of the non-volatile memory 13 and the TPM 14 can be restrained.

Since the second sub board B2 and the chip board BC are attachable to and removable from the third sub board B3, the non-volatile memory 13 and the TPM 14 can be readily replaced. This enables a flexible response to a change in the configuration corresponding to the destination to which the multifunction device 1 is sent, or the like.

Third Embodiment

A third embodiment of the present disclosure will now be described. In this embodiment, a component similar to that in the first embodiment is denoted by a similar reference sign and is not described further in detail. A modification example applied to a component in the first embodiment is similarly applied to a similar component in this embodiment.

Figure 6:
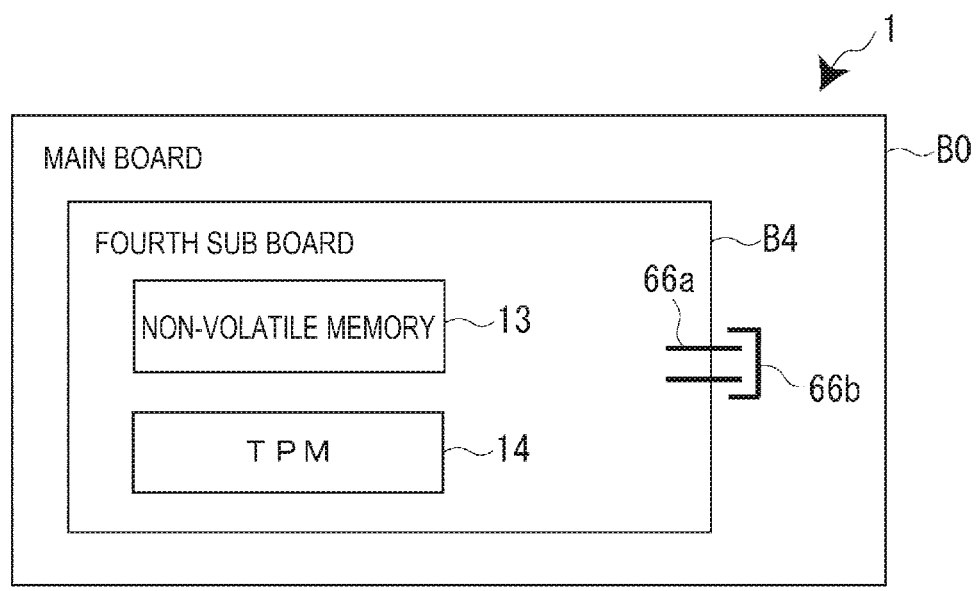
FIG. 6 shows a board configuration according to a third embodiment.

FIG. 6 shows the board configuration according to the third embodiment. The multifunction device 1 has a fourth sub board B4. The fourth sub board B4 has the non-volatile memory 13 and the TPM 14 attached thereto and is configured to be attachable to and removable from the main board B0.

The fourth sub board B4 has a fourth sub board-side attachment part 66a. The main board B0 has a main board-side third attachment part 66b. As the fourth sub board-side attachment part 66a and the main board-side third attachment part 66b engage with each other, the fourth sub board B4 is removably installed on the main board B0.

As described above, in the multifunction device 1 according to the third embodiment, the fourth sub board B4 having the non-volatile memory 13 and the TPM 14 attached thereto is attachable to and removable from the main board B0. Therefore, the non-volatile memory 13 and the TPM 14 can be integrally managed. Thus, when the main board B0 is replaced due to a malfunction or the like of the main board B0, the occurrence of a wrong combination of the non-volatile memory 13 and the TPM 14 can be restrained.

Also, the board configuration is simpler than the board configuration in the first embodiment shown in FIG. 4 and the board configuration in the second embodiment shown in FIG. 5. Therefore, the manufacturing cost of the control board can be restrained.

While three embodiments have been described above, the present disclosure is not limited to these embodiments. Modification examples described below can be employed. Also, the modification examples can be combined according to need.

Modification Example 1

In the board configuration in the first embodiment shown in FIG. 4, the non-volatile memory 13 and the TPM 14 may be replaced with each other. In this case, the multifunction device 1 has the main board B0, a fifth sub board which has the TPM 14 attached thereto and is attachable to and removable from the main board B0, and a sixth sub board which has the non-volatile memory 13 attached thereto and is attachable to and removable from the fifth sub board.

Modification Example 2

The module for decrypting the encrypted information 13b is not limited to the TPM 14. Another security chip may be used.

Modification Example 3

The board configurations in the respective embodiments and modification example 1 may be employed for an electronic apparatus other than the multifunction device 1. As the electronic apparatus, a printer, a scanner, a projector, a copy machine or the like can be employed.

Modification Example 4

The embodiments can also be applied to a method for executing each processing such as the processing of encrypting the user information or decrypting the encrypted information 13*b* described in each embodiment, a program for executing each processing, and a computer-readable recording medium storing the program. Also, suitable changes can be made without departing from the spirit and scope of the present disclosure.

Supplementary Notes

Supplementary notes on the electronic apparatus are given below.

The electronic apparatus includes: a non-volatile memory 13 storing encrypted information 13*b*, which is information that is encrypted; a TPM 14 for decrypting the encrypted information 13*b*; and a main board B0 communicating with the non-volatile memory 13 and the TPM 14. The non-volatile memory 13 and the TPM 14 are attachable to and removable from the main board B0, as a single body.

This configuration enables the non-volatile memory 13 and the TPM 14 to be attached to and removed from the main board B0, as a single body. Thus, when the main board B0 is replaced, the occurrence of a wrong combination of the non-volatile memory 13 and the TPM 14 can be restrained.

The electronic apparatus may further include: a sub board part BS which has the non-volatile memory 13 and is attachable to and removable from the main board B0; and a chip board BC which has the TPM 14 attached thereto and is attachable to and removable from the sub board part BS.

This configuration enables the TPM 14 to be easily replaced by attaching and removing the chip board BC to and from the sub board part BS.

In the electronic apparatus, the sub board part BS may have a first sub board B1 which has the non-volatile memory 13 attached thereto and is attachable to and removable from the main board B0 and which the chip board BC is attachable to and removable from.

According to this configuration, the first sub board B1 having the non-volatile memory 13 attached thereto and having the chip board BC installed thereon can be attached to and removed from the main board B0.

In the electronic apparatus, the sub board part BS may have: a second sub board B2 having the non-volatile memory 13 attached thereto; and a third sub board B3 which is attachable to and removable from the main board B0 and which the second sub board B2 and the chip board BC are attachable to and removable from.

According to this configuration, the third sub board B3 on which the second sub board B2 having the non-volatile memory 13 attached thereto and the chip board BC are installed thereon can be attached to and removed from the main board B0.

In the electronic apparatus, the encrypted information 13*b* may be information formed by encrypting user information registered to the electronic apparatus by a user.

According to this configuration, even when the main board B0 is replaced, as the encrypted information 13*b* is left in the non-volatile memory 13, the user information can be acquired by decrypting the encrypted information 13*b*.

In the electronic apparatus, the non-volatile memory may store first identification information which is information unique to the electronic apparatus. The TPM 14 may store second identification information corresponding to the first identification information. The electronic apparatus may further include a CPU 11 determining whether the TPM 14 forms a correct combination with the non-volatile memory 13, based on the first identification information stored in the non-volatile memory 13 and the second identification information stored in the TPM 14.

This configuration enables the electronic apparatus to determine whether the non-volatile memory 13 and the TPM 14 form a correct combination.

In the electronic apparatus, the TPM 14 may store a second encryption key 14*b*. The non-volatile memory 13 may store the encrypted information 13*b* encrypted by a first encryption key, and encryption key information 13*c* formed by encrypting the first encryption key by a second encryption key 14*b*. When it is determined that the TPM 14 forms a correct combination with the non-volatile memory 13, the CPU 11 may deliver the encryption key information 13*c* to the TPM 14, receive from the TPM 14 the first encryption key obtained by decrypting the encryption key information 13*c* by the second encryption key 14*b*, and decrypt the encrypted information 13*b*, based on the first encryption key.

According to this configuration, the electronic apparatus can decrypt the encrypted information 13*b* when the non-volatile memory 13 and the TPM 14 form a correct combination.

What is claimed is:

1. An electronic apparatus comprising:
   a non-volatile storage medium storing encrypted information, which is information that is encrypted;
   a security chip for decrypting the encrypted information; and
   a main board communicating with the non-volatile storage medium and the security chip, wherein
   the main board has a first attachment part to which the non-volatile storage medium and the security chip are attached as a single body,
   a sub board part has the non-volatile storage medium and is attachable to and detachable from the attachment part of the main board;
   a chip board has the security chip attached thereto, the chip board attachable to and detachable from the sub board part by a second attachment part, and
   the sub board part has a first sub board which ahs the non-volatile storage medium attached thereto and is attachable to and removable from the attachment part of the main board and which the chip board is attachable to and removable from.

2. The electronic apparatus according to claim 1, wherein the sub board part has:
   a second sub board having the non-volatile storage medium attached thereto; and
   a third sub board which is attachable to and removable from the attachment part of the main board and which the second sub board and the chip board are attachable to and removable from.

3. The electronic apparatus according to claim 1, wherein the encrypted information is information formed by encrypting user information registered to the electronic apparatus by a user.

4. The electronic apparatus according to claim 1, wherein
the non-volatile storage medium stores first identification information which is information unique to the electronic apparatus,
the security chip stores second identification information corresponding to the first identification information, and
the electronic apparatus further comprises a control unit determining whether the security chip forms a correct combination with the non-volatile storage medium, based on the first identification information stored in the non-volatile storage medium and the second identification information stored in the security chip.

5. The electronic apparatus according to claim 4, wherein
the security chip stores a second encryption key,
the non-volatile storage medium stores the encrypted information encrypted by a first encryption key, and encryption key information formed by encrypting the first encryption key by a second encryption key, and
when it is determined that the security chip forms a correct combination with the non-volatile storage medium, the control unit delivers the encryption key information to the security chip, receives from the security chip the first encryption key obtained by decrypting the encryption key information by the second encryption key, and decrypts the encrypted information, based on the first encryption key.

\* \* \* \* \*